Aug. 10, 1926.
W. W. NOELTING ET AL
1,595,214
CASTER BRACKET SOCKET FOR CHANNELED LEGS
Filed June 13, 1925  2 Sheets-Sheet 1
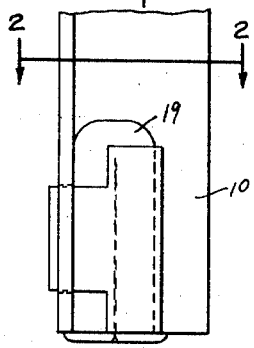
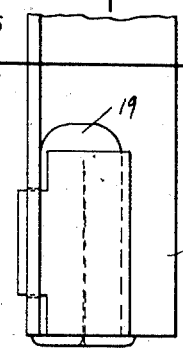
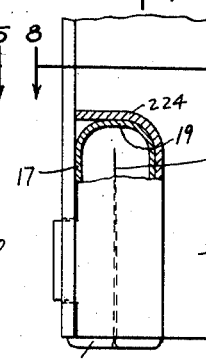
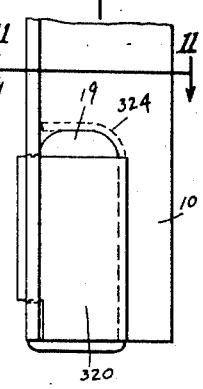
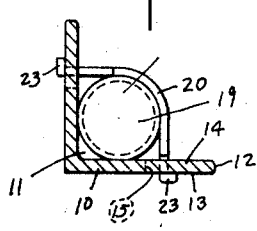
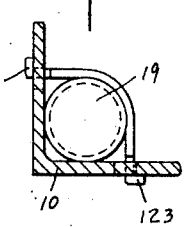
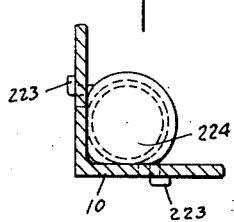
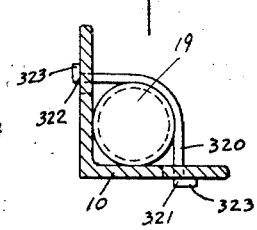
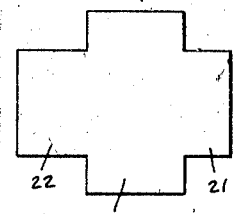
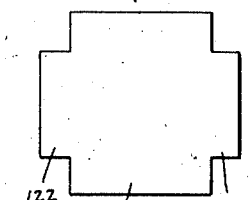
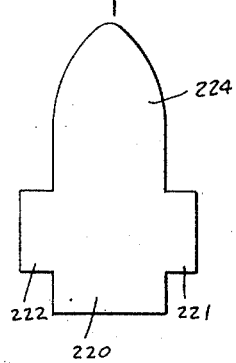
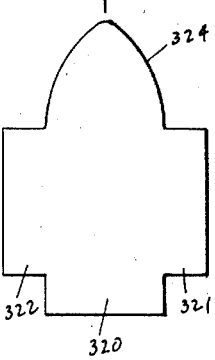
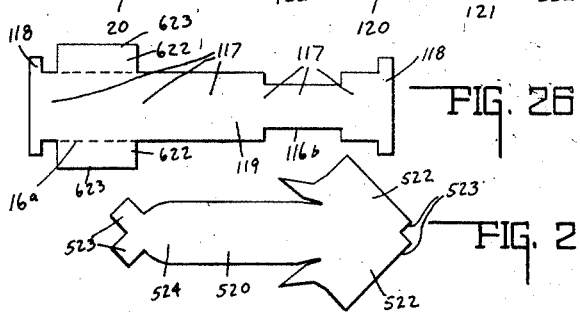
INVENTORS.
WALTER W. NOELTING.
WILLIAM H. NOELTING.
EDWARD A. BROKAW.
BY Lockwood & Lockwood
ATTORNEYS.

Aug. 10, 1926.
W. W. NOELTING ET AL
1,595,214
CASTER BRACKET SOCKET FOR CHANNELED LEGS
Filed June 13, 1925    2 Sheets-Sheet 2
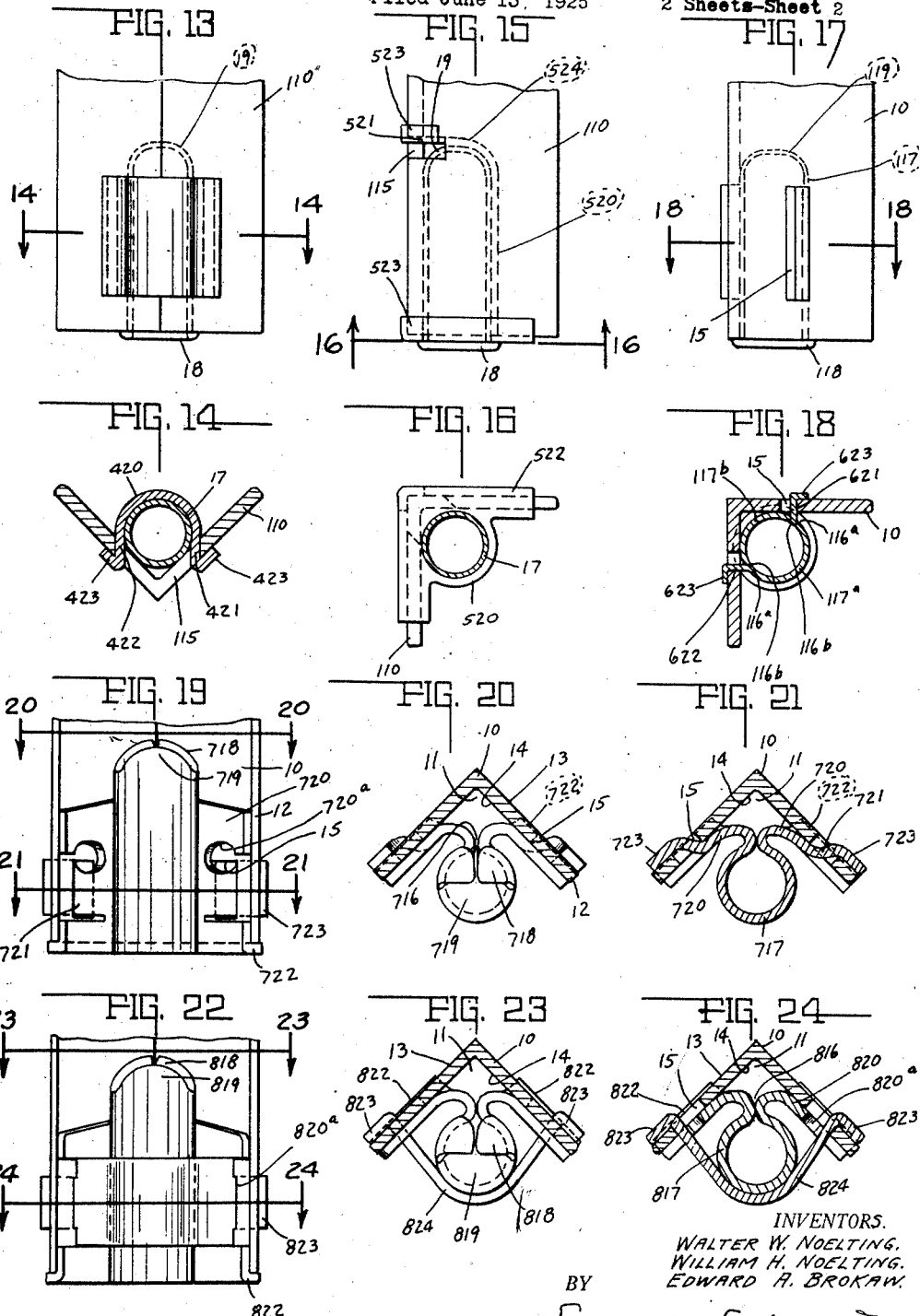
INVENTORS.
WALTER W. NOELTING.
WILLIAM H. NOELTING.
EDWARD A. BROKAW.
BY
Lockwood & Lockwood
ATTORNEYS.

Patented Aug. 10, 1926.

1,595,214

UNITED STATES PATENT OFFICE.

WALTER WM. NOELTING, WILLIAM H. NOELTING, AND EDWARD A. BROKAW, OF EVANSVILLE, INDIANA, ASSIGNORS TO FAULTLESS CASTER COMPANY, OF EVANSVILLE, INDIANA, A CORPORATION.

CASTER-BRACKET SOCKET FOR CHANNELED LEGS.

Application filed June 13, 1925. Serial No. 36,871.

This invention relates to an inside bracket construction for legs such as angle iron legs having a channel or groove therein, receiving said bracket construction in turn receiving a caster.

The chief object of the invention is to provide a bracket construction which may be readily attached to and, when attached, rigidly secured to the inside of a channeled leg such as a channel or angle iron or similar leg constructions, which bracket construction is adapted to support a caster stem or pedal.

The chief feature of the invention consists in associating a tubular socket with a clamping member engaging one side of the socket for clamping the socket to the leg at the inside of the channel thereof, which clamping construction may be and preferably is readily insertible or positionable upon the channeled leg and is moved into clamping engagement with the socket by the insertion of the socket in the pocket formed between the clamping member and the leg.

Another feature of the invention consists in the arrangement of the parts whereby the channeled leg includes but a pair of longitudinally extending slots near the bottom end thereof, which slots are preferably substantially parallel and lie in opposite faces of the channeled leg or in the opposite faces of the angle leg.

Another feature of the invention is that the socket clampingly supported by the clamping member upon the leg, is limited in longitudinal movement along the leg by engagement of the base of said socket with the bottom of the leg, or engagement of the base of said socket with the bottom of the clamping member or by the engagement of the base of the said socket with the bottom of the leg and the clamping member as desired.

Still a further feature of the invention consists in the utilization of a tubular socket formed from a single piece of metal and having at least one and preferably not more than two longitudinal lines of separation and the associating a socket of the character described with a clamping construction which extends substantially the full length of the socket for forming a pocket extending substantially the full length of the socket for receiving the same and preventing opening movement of said tubular socket having the longitudinal edges specified.

Another feature of the invention consists in the addition of an overhanging hood, if desired, which is not only ornamental but also may serve when necessary or desired, to limit longitudinal movement of the socket along the leg in the event that socket engagement with the bottom of the leg or bottom of the clamping member is not desired. Such a construction, therefore, permits the socket to be mounted above the bottom of the leg wherever such mountings are necessary or desirable.

The full nature of the invention will be understood from the accompanying drawings and the following description and claims:

In the drawings Fig. 1 is a side elevational view of one form of socket clamping member and angle iron leg showing the same in assembled relation. Fig. 2 is a transverse sectional view taken on line 2—2 of Fig. 1 and in the direction of the arrows. Fig. 3 is a plan view of the developed blank forming the clamping member shown in Figs. 1 and 2. Fig. 4 is a similar view to Fig. 1, and a modified form of the invention. Fig. 5 is a transverse sectional view taken on line 5—5 of Fig. 4 and in the direction of the arrows. Fig. 6 is a developed blank view of the clamping member shown in Figs. 4 and 5. Fig. 7 is an elevational view of another modified form of the invention and shows parts broken away to show other parts in section. Fig. 8 is a transverse sectional view taken on line 8—8 of Fig. 7 and in the direction of the arrows. Fig. 9 is a plan view of the developed blank forming the clamping member shown in Figs. 7 and 8. Fig. 10 is an elevational view of a further modified form of the invention and is similar to Figs. 1, 4 and 7. Fig. 11 is a transverse sectional view taken on line 11—11 of Fig. 10 and in the direction of the arrows. Fig. 12 is a plan view of the developed blank forming the member shown in Figs. 10 and 11. Fig. 13 is a front view of an angle iron leg showing the socket and bracket associated therewith. Fig. 14 is a transverse sectional view of the same taken on line 14—14 of Fig. 13 and in the direction of the arrows. Fig. 15 is a side elevational view of an angle iron leg and socket and another form of modification of the invention. Fig. 16 is a bottom plan view of the leg and bracket socket being shown in section, and the view being on line 16—16 of Fig. 15 and in the direction of the arrows. Fig. 17 is a side elevational view of a further modified form of bracket associated with the socket and angle iron leg. Fig. 18 is a transverse sectional view taken on line 18—18 of Fig. 17 and in the direction of the arrows. Fig. 19 is a front elevation of the lower end of an angle iron leg to which is attached a modified and unitary type of combination socket and clamp. Fig. 20 is a transverse sectional view taken on the line 20—20 of Fig. 19 and in the direction of the arrows. Fig. 21 is a similar view taken upon line 21—21 of Fig. 19. Fig. 22 is a front elevation of the lower end of an angle iron leg to which is attached a modified type of combination socket and clamp. Fig. 23 is a transverse sectional view taken on the line 23—23 of Fig. 22 and in the direction of the arrows. Fig. 24 is a similar view taken on the line 24—24 of Fig. 22 and in the direction of the arrows. Fig. 25 is a plan view of the blank required for clamp shown in Figs. 15 and 16. Fig. 26 is a plan view of the blank required for the clamp shown in Figs. 17 and 18.

In the drawings 10 indicates an angle iron leg having a channel 11 formed by the sides thereof, and said angle iron leg includes edges 12, an exposed face 13 and an inner face 14. Herein extending through each side of the angle iron leg and adjacent the bottom thereof is an elongated slot 15. This slot 15 is of considerable width as shown. Herein a pair of slots 15 are illustrated, one in each side of the angle iron and in substantially parallel relation. These slots may be formed by milling or punching or in any other suitable way, and herein they are shown extending longitudinally of the leg and lie substantially in common planes and parallel to the bottom of the leg.

There is herein illustrated a socket which may be of any conventional type, of which there are several, but herein the same is illustrated as formed from a single piece of sheet metal which is bent back upon itself providing a plurality of pairs of abutting edges 16 to form a tubular socket 17, having the head portion 19 which is the connection between the sides of the socket. The ends of these sides forming the tubular socket are turned angularly as at 18 and form a base portion. The connection between the base and the socket portion is preferably curved so that the mouth of the socket is bell shaped.

The bracket or clamping member is associated with a leg of the character described and a socket of the character described and these legs and sockets in the several views are shown substantially identical. The several figures illustrate different forms of clamping members.

In Fig. 3 there is illustrated in plan the development of one form of clamping member shown in operative relation in Figs. 1 and 2. Herein the body portion 20 includes a pair of opposite extensions 21 and 22. The extensions 21 and 22 are not of the same length. Each of the extensions, however, is provided with an angularly turned portion 23 at its outer edge. As shown clearly in Fig. 2 the width of the slot 15 in the leg is sufficient to permit the passage of the angular portion 23 of the extension 21 or 22.

In Figs. 1 and 2 it will be observed that the body portion 20 of the clamping member is shown curved. The curvature is preferably greater than 90 degrees and less than 180 degrees although a lesser angle or a greater angle may be employed without departing from the broader features of the invention.

The method of mounting the bracket construction is as follows: The elongated extension 22 with its angularly turned end 23 is passed through one of the openings 15 until the side edges of the body portion 21 engage the inner wall 14 of the leg. When in this position the extension 21 with its angular end 23 is in registration with the other slot 15 in the other side of the leg. The extension is then passed through the slot and the bracket is retracted from the first slot, that is, the extension 22 is returned until the angularly turned end 23 thereof engages the outer side 13 of the leg at the same time the other angularly turned end 23 engages the outer side 13 of the other side of the leg. Thereafter the tubular socket is inserted in the pocket formed by the angle of the angle iron leg. The clamping member and it is driven into the same and the dimensions of the three parts, towit, the leg, clamping member and socket, are such that frictional engagement is secured which is sufficient to maintain the clamping member in clamping position and clamping relation, mounted upon the angle iron leg, and to yieldingly retain the socket upon the leg. Longitudinal movement of the socket within the pocket thus formed is limited by the engagement of the base 18 of said socket with the bottom edge of the leg or with the bottom edge of the body portion 20, or both, as shown in Figs. 1 and 2.

In Fig. 6 there is illustrated another form of the invention which includes a body portion 120 having a pair of extensions 121 and 122, each of which is provided with an angular end 123. This form of the invention shows the ends 121 and 122 as being of substantially equal length. The method of mounting is not the same as that heretofore described for the bracket shown in Figs. 1 to 6 inclusive. In this form of the invention the body portion 120 is curved and the curvature is slightly greater than that shown in Fig. 2 although it may be less than or greater than the same. The dimensions and relationship are such that the clamping member when positioned within the angle is constructed such that the extensions 121 and 122 when their angular ends 123 will just pass through the slots. After this passage is effected the member may be struck with a hammer or other suitable tool which will cause the tongue portions to widen out into locking engagement when the tube socket is driven into place in the pocket formed between the leg and the clamping member. This positioning of the socket takes up the loose play and forces the angular ends of the tongue extensions to bear against the outside surface of the leg adjacent the slot.

In both forms of the invention heretofore described it will be apparent that the angular ends are turned oppositely and outwardly and the terminology "angular ends" is intended to cover all modifications thereof howsoever turned.

In Figs. 7 to 9 inclusive there is illustrated a modified form of clamping member, and in this form of the invention the body portion 220 is similar to the body portion 120 and includes the tongue extensions 221 and 222 herein shown substantially equal in length each terminating in an angular end 223. However, in this form of the invention the body portion 220 is extended as at 224 which is turned angularly of the main body portion and is adapted to lie at right angles thereto forming a hood or cover as shown clearly in Figs. 7 and 8. In this form of the invention the hood or cover may serve to limit longitudinal movement of the socket in the pocket or said hood may be utilized solely for ornamentation or protection, or may be utilized for all purposes.

In Figs. 10 and 11 a further modified form of the invention is illustrated and in this form of the invention the clamping member 320 is provided with similar tongues 321 and 322 having angularly turned ends 323 and the clamping member is similar to the clamping member shown in Fig. 6, except that in this form of the invention the tongues instead of being positioned intermediate the upper and lower ends of the body portion, are positioned at one end, the upper end thereof thereby increasing the bearing. It will also be apparent that a further modified form of the invention may be illustrated. Herein see Fig. 12 a hood 324 similar to the hood 224 shown in Fig. 7 may be provided upon a clamping member of the character shown in 320.

In Fig. 13 angle iron 110 is shown provided with a single slot 115, which is at the corner of the leg although it is not necessarily positioned at this point. This positioning permits the single transverse opening 115 to be formed by punching or by milling as desired. Associated with this form of the invention is a socket 17 having the cap 19 and base 18 all as heretofore described. The body portion 420 of the clamping or bracket members includes the extensions 422 and 421 which are provided with angularly turned ends 423. In this form of the invention the bracket is U-shaped with its two sides positioned in closer relationship than the width of the socket so that the ends 422 are passed through the slot 115 of the leg 110. After being passed therethrough the ends or extensions may be struck and separated or a socket 17 may be driven upwardly into the pocket formed by the bracket and the angle iron and thus separate said extensions into locking engagement with the leg.

In Figs. 15 and 16 a further modified form is illustrated and herein the leg 110 includes the single transverse slot 115 at its corner. The socket member is the usual socket having the base 18, tubular portion 17 and cap portion 19. The bracket member, see Fig. 25, comprises a body portion 520, a cap portion 524 which is extended as at 521 and is provided with an angular end 523. This angularly turned end is angularly outlined so as to form a pocket to engage the angularly positioned faces of the angle iron. The lower portion of the body portion 520 includes the lateral portion 522 with angularly turned end portions 523. Herein the angular ends 522 and 523 extend in the same direction and likewise are similar; that is, they lie in the same plane and are substantially rectangular in outline. In this form of the invention the extension 521 is positioned in the slot 115 and when thus positioned the extension 522 with its angular end just clears the end of the angle iron leg 110. Lateral movement of the bracket, therefore forces the extension 521 through the opening or slot 115 and passes the extension 522 laterally of the end of the leg until the transverse portion 523 of the extensions 521 and 522 lie in a pane parallel to the angle iron. When thus positioned the bracket may be driven upwardly along the leg and thus the bracket is anchored to the leg. Thereafter in the pocket formed between the leg and the bracket, the socket may be inserted and the socket will maintain the bracket in position and be maintained in position on the leg by the bracket.

The form of the invention disclosed in Figs. 15 and 16 may be further modified as follows: It is not necessary that a single transverse slot be utilized, but a pair of transverse slots oppositely positioned may be utilized, and in this event the pair of angular extensions 521, including angular ends 523, each pass through one of the slots thus formed. The lower extension 522 may be cup formed as shown in Figs. 15 and 16, or may constitute a pair of extensions as angularly turned ends 523 that may or may not lie in longitudinal alignment with the angular extensions 521. These various modifications of this form of the invention will be readily apparent from the foregoing.

In the form of the invention shown in Figs. 17 and 18 the angle iron 10 is shown provided with a pair of longitudinal slots 15 oppositely positioned. Herein, see Fig. 26 also the clamping bracket and the socket are integral but portions of the same are so arranged that a clamping engagement is secured. In this form of the invention the socket has a tubular body portion 117 formed by a pair of curved portions 117$^a$ and 117$^b$, that have abutting edges 116$^a$. The curved body portion 117$^a$ is connected to the curved body portion 117$^b$ by the top portion 119. Each of the body portions 117$^a$ and 117$^b$ terminate in a flange or base portion 118. The body portion 117$^b$ is notched intermediate its ends as at 116$^b$. The body portion 117$^a$ upon opposite sides is provided with the extensions 622 and 621 which termiate in angular ends 623. The notched portions 116$^b$ are adapted to seat the laterally and outwardly extending projections 621 and 622.

In Figs. 19 to 21, inclusive, a variation of the form shown in Figs. 17 and 18 is illustrated, to-wit, a combination unitary and integral socket and clamping anchorage. In said first-mentioned figures the leg 10 includes the pair of parallel slots 15 in opposite faces. The clamping portions 720 are extended at 721 through slots 15 and the ends are angularly positioned as at 723. The wings include lateral extensions 722 underlying the end of the leg and support the same. They also limit upward longitudinal movement of the socket on the leg. The socket includes a body 717 having a single longitudinal slit 716 medially positioned, and integral therewith is the head 719 including reinforcing caps 718.

In Figs. 22 to 24, inclusive, a modification of the foregoing is illustrated. In this form the clamping members are separable from the socket member. The angle iron leg 10 has the usual notches 15 and herein the socket see Fig. 26 includes the body 817 with a head 819 and flaps 818. The socket also has a single longitudinal opening slit or opening 816 and the walls are extended to form wings 820 which are apertured at 820$^a$ to receive the ends of clamping member 824 which extends therethrough and beyond the openings 15. Said member 824 has angular ends 823. The body 820 includes similar lateral wing extensions 822.

In the claims the terms "channeled leg" is not intended to be specific to a channel leg, but intended to include angle irons, V-irons and channel irons. Likewise, the term "curved" referred in part to the outline of the clamping portion, is intended to include not only a regular outline such as an angular arrangement, for it is perfectly possible to utilize a V-shaped clamping member and thus form with an angle iron a square pocket that will readily receive a tubular socket. Likewise, the term "channeled" referring to the leg is intended to include legs wherein the sides meet not only with an angle but also those with a curvature as well. Unless specifically set forth in the claims the term "tubular socket" does not necessarily refer to a headed socket and unless specifically set forth, the term "tubular socket" is not intended to include a socket having an outwardly flanged base.

While the invention has been described in great detail in the foregoing specification and various modifications have not only been illustrated and described, but have been suggested as well, it is to be understood that these modifications together with those which will readily suggest themselves with persons skilled in the art, are all to be considered within the broad purview of this invention, reference being had to the appended claims.

The invention claimed is:

1. The combination of a slotted channeled leg, a caster pintle socket receiving portion, and an anchoring strap having a socket seating portion, and a plurality of extensions extending oppositely therefrom and slidably receivable by the channel slotting for anchoring the strap to the leg and wedgingly anchored thereto by socket insertion in the pocket formed between said strap and the channeled leg.

2. A device of the character described in claim 1 characterized by the strap extensions having angularly extending ends for engaging the opposite face of the leg from that forming the pocket.

3. A device of the character described in claim 1 characterized by the socket having a laterally extending base engageable upon the end of the leg for limiting longitudinal movement of the socket with respect to the leg.

4. A device of the character described in claim 1 characterized by the socket having a laterally extending base engageable upon the bottom end of the anchoring strap.

5. A device of the character described in claim 1 characterized by one end of the leg and the bottom of the anchoring strap terminating in substantially the same plane and laterally extending means on said strap for limiting longitudinal movement of the socket in the pocket formed by the strap and the leg.

6. A device of the character described in claim 1 characterized by a transversely positioned extension for closing the upper end of the pocket formed by said anchoring strap.

In witness whereof, we have hereunto affixed our signatures.

WALTER WM. NOELTING.
WILLIAM H. NOELTING.
EDWARD A. BROKAW.